United States Patent [19]

Hamersma et al.

[11] Patent Number: 5,318,854
[45] Date of Patent: Jun. 7, 1994

[54] POLYMER MIXTURE BASED ON A POLYBUTYLENE TEREPHTHALATE ESTER AND A S-MA COPOLYMER AND FILMS MADE THEREOF

[75] Inventors: Wilhelmus J. L. A. Hamersma, Bergen op Zoom, Netherlands; Roger W. Avakian, Brasschaat, Belgium

[73] Assignee: General Electric Co., Pittsfield, Mass.

[21] Appl. No.: 1,949

[22] Filed: Jan. 4, 1993

Related U.S. Application Data

[63] Continuation of Ser. No. 671,638, Mar. 20, 1991, abandoned, which is a continuation of Ser. No. 518,251, May 7, 1990, abandoned, which is a continuation of Ser. No. 192,285, Jun. 14, 1988, abandoned.

[30] Foreign Application Priority Data

Aug. 26, 1986 [NL] Netherlands .................. 8602160

[51] Int. Cl.$^5$ ............................................. B32B 27/08
[52] U.S. Cl. .................................... 428/483; 525/64; 525/166; 525/176
[58] Field of Search ................ 525/64, 166, 176; 428/483

[56] References Cited

U.S. PATENT DOCUMENTS

| | | | |
|---|---|---|---|
| 3,484,339 | 12/1969 | Caldwell | 161/231 |
| 3,644,574 | 2/1972 | Jackson, Jr. et al. | 260/873 |
| 3,657,389 | 4/1972 | Caldwell | 525/176 |
| 3,728,212 | 4/1973 | Caldwell | 525/176 |
| 4,080,354 | 3/1978 | Kramer | 260/40 R |
| 4,126,602 | 11/1978 | Sakee | 260/40 R |
| 4,346,195 | 8/1982 | Hornbaker et al. | 525/176 |
| 4,386,186 | 5/1983 | Maresca et al. | 525/68 |
| 4,429,076 | 1/1984 | Saito et al. | 525/57 |
| 4,493,919 | 1/1987 | Durbin et al. | 524/505 |
| 4,497,924 | 2/1985 | Robeson et al. | 524/151 |
| 4,526,923 | 7/1985 | Hornbaker et al. | 525/502 |
| 4,582,876 | 4/1986 | Weemes | 525/64 |
| 4,665,122 | 5/1987 | Robeson et al. | 524/504 |
| 4,717,752 | 1/1988 | Yates, III et al. | 525/175 |

FOREIGN PATENT DOCUMENTS

| | | |
|---|---|---|
| 1029145 | 4/1978 | Canada . |
| 0042724 | 12/1981 | European Pat. Off. . |
| 308179 | 3/1989 | European Pat. Off. . |
| 359565 | 3/1990 | European Pat. Off. . |
| 8801569 | 3/1988 | PCT Int'l Appl. . |
| 8801633 | 3/1988 | PCT Int'l Appl. . |
| 2076832 | 12/1981 | United Kingdom . |

*Primary Examiner*—Patricia A. Short

[57] ABSTRACT

Disclosed are polymer mixtures comprising a polybutylene terephthalate ester and a rubber-modified styrene-maleic anhydride copolymer. The polymer mixtures are suitable for the manufacture of films which can be readily bonded to polystyrene substrates.

6 Claims, No Drawings

POLYMER MIXTURE BASED ON A POLYBUTYLENE TEREPHTHALATE ESTER AND A S-MA COPOLYMER AND FILMS MADE THEREOF

This is a continuation application of Ser. No. 07/671,638 filed on Mar. 20, 1991, now abandoned, which is a continuation of Ser. No. 07/518,251 filed on May 7, 1990, now abandoned, which is a continuation of Ser. No. 07/192,285 filed on Jun. 14, 1988, now abandoned.

The invention relates to a polymer mixture based on a polybutylene terephthalate ester and styrene-maleic anhydride copolymer and to films made thereof.

Polymer mixtures comprising a polybutylene terephthalate and a vinyl aromatic polymer are known from U.S. Pat. No. 3,644,574. The vinyl aromatic polymer is added to the polybutylene terephthalate in order to increase the impact strength and/or stiffness and/or heat distortion temperature and/or tensile strength of the polybutylene terephthalate. By way of example of a vinyl aromatic polymer one may use according to U.S. Pat. No. 3,644,574 a poly (50/50 styrene/maleic anhydride).

It has now been found that by using a special type of styrene-maleic anhydride copolymer in polybutylene terephthalate based polymer mixtures one obtains a mixture from which one can make a film which readily adheres to a polystyrene film. Even without using a special bonding agent one can obtain a good adhesion by merely applying heat and pressure between the polystyrene film and the film made out of the polymer mixture according to the invention.

The use of a special type of styrene-maleic anhydride copolymer in the polymer mixture according to the invention moreover results in a mixture having an optimal combination of properties in particular an optimal, combination of adhesive properties, melt processability and mechanical properties.

The polymer mixture according to the invention is characterized in that it comprises a rubber modified styrene-maleic anhydride copolymer with a rubber content of 3-20% by weight, with 3-20 mol % maleic anhydride and 80-97 mol % styrene and with a number average molecular weight as determined by gel permeation chromatography (against a polystyrene standard) of 50,000-400,000.

The polymer mixture preferably comprises 1-50% by weight of the styrene-maleic anhydride copolymer and 99-50% by weight of the polybutylene terephthalate.

GB-A-2076832 describes the addition of styrene-maleic anhydride copolymers to polybutylene terephthalate esters in order to improve the adhesion properties thereof. As styrene-maleic anhydride copolymers those having a molecular weight from about 2,000 to about 20,000 are according to GB-A-2076832 the preferred ones. Said copolymers are exemplified by DYLARK ® 232, which is a non rubber modified styrene-maleic copolymer.

It has now been found that the special styrene-maleic anhydride as defined above in polybutylene terephthalate results in a better combination of properties as compared to the use of the low molecular weight non-rubber modified copolymers as referred to in GB-A-2076832.

The polymer mixture according to the invention comprises at least the following constituents:

A. a polybutylene terephthalate ester and
B. a rubber modified styrene-maleic anhydride copolymer.

A. Polybutylene terephthalate ester

Polybutylene terephthalate esters (PBT) are generally known polymers. They are usually prepared by the condensation reaction of 1,4-butanediol and terephtalic acid.

In the PBT esters according to the invention up to 20 mol % of the butanediol component may have been replaced by one or more suitable diol- or polyol compounds. It is also possible to use PBT esters in which up to 20 mol % of the terephthalate acid component has been replaced by other dicarboxylic acids or polycarboxylic acids. When both the 1,4-butanediol and the terephthalate acid have been partly replaced the sum total of the 1,4-butanediol and the terephthalate acid component in the PBT ester should be at least 70 mol %.

The polymer mixture according to the invention preferably has an intrinsic viscosity from 0.7 to 2.0, more preferably from 0.7–1.5 dl per gram (measured in a 60/40 mixture of phenol/tetrachloroethane at 25° C.).

B. Rubber modified styrene-maleic anhydride copolymers

Rubber modified styrene-maleic anhydride copolymers of the types used in the polymer mixture according to the invention are generally known. They are commercially available from Arco under the trademark designation DYLARK ®.

In order to obtain an optimal balance in mechanical and adhesive properties and in melt processability the copolymer should have a rubber content between 3–20% by weight, a maleic anhydride content of 3–20 mol % and a styrene content of 80–97 mol %. The number average molecular weight as determined by gel permeation chromatography while using a polystyrene standard, should lie between 50,000 and 400,000, preferably between 100,000 and 400,000.

In addition to the above-mentioned constituents the polymer mixture according to the invention may comprise further constituents generally used in mixtures based on polyalkylenephthalate esters. Examples of such further constituents are agents to improve the impact strength, inert fillers, reinforcing fibres, agents to improve the flame-retarding properties, pigments and dyes, mould-release agents, stabilisers, processing aids, plasticisers.

The polymer mixture according to the invention can be obtained according to the conventional methods of preparing polymer mixtures based on thermoplastics. The polymer mixture according to the invention can be prepared by the collective extrusion of the individual constituents in an extruder. The resulting extrudate is then chopped to form pellets. It is possible to manufacture a layer or a film from the resulting pellets by melt extrusion. This layer may be bonded to a polystyrene layer. It is also possible to co-extrude the pellets to form a laminate in a machine which is suitable for coextrusion.

It is also possible to transfer the individual constituents of the polymer mixture according to the invention to an extruder or coextruder which has a gapshaped extrusion head. In this case, a film or foil of the polymer mixture according to the invention is directly obtained.

The invention will be described in greater detail with reference to the ensuing specific examples.

In the examples, polymer mixtures were used which had been prepared as follows: the polybutylene terephthalate ester together with the indicated functionalised polystyrene compound was extruded in an extruder and chopped to form pellets. The extruder had been adjusted at a temperature of approximately 250° C. (250 rpm).

In the manner described hereinafter in Example I and Example II, laminates were manufactured from the resulting pellets of the polymer mixture according to the invention. The laminates always consisted of two layers: one film of high-impact polystyrene and one film of a pure polybutylene terephthalate ester or of a polymer mixture according to the invention.

EXAMPLE I

Several different films were manufactured out of polymer mixtures having a composition as indicated hereinafter (Table A). The films were prepared by compressing the polymer mixtures in a mould (dimension of the compressed films: 180×50×0.65 mm). The mixtures were first heated in the mould to just above their softening point and were kept at that temperature for 30 seconds. The material was then brought under a pressure of 25 kN for two minutes. The obtained films were then cooled in air.

TABLE A

| Layer no. | Composition (% by weight) |
|---|---|
| 1 | High-impact polystyrene (with 9.5% by weight of rubber and 20–25% by weight of gel fraction). |
| 2 | Polybutyleneterephthalate (PBT) (intrinsic viscosity 1.18 dl/g. |
| 3 | 80% by weight of PBT + 20% by weight of rubber-modified styrene-maleic anhydride copolymer (DYLARK ® 250), with a rubber content of about 15% by weight, a maleic anhydride content of about 10 mol %, a styrene content of about 90 mol % and a number average molecular weight as determined by gel permeation chromatography (against a polystyrene standard) of about 190,000. |
| 4 | 50% by weight of PBT + 50% by weight of DYLARK ® 250. |

Several multilayer structures, each consisting of one film 1 and one of the films 2 to 4 were manufactured.

The structures were manufactured by pressing the films one on top of the other under a pressure of 25 kN for 2 minutes at 250° C.

The mutual bonding strength of the films in the resulting two-layer structures was determined as follows. The two layers were separated from each other mechanically (by means of a knife) over a length of 40 mm. The resulting ends were each bent at an angle of approximately 90° with the two-layer structure and clamped in a drawing machine. The layers were pulled apart at a drawing rate of 5 mm/minute. The force occurring when the two layers detached (fracture) was determined. The values found are recorded in Table B.

TABLE B

| Structure built up from layer Nos. | Force when the layers detached (N) |
|---|---|
| 2 & 1* | 4 |
| 3 & 1 | 12.5 |

TABLE B-continued

| Structure built up from layer Nos. | Force when the layers detached (N) |
|---|---|
| 4 & 1 | 24 |

*comparative example

It may be seen from the results of Table B that it is possible with the polymer mixtures according to the invention (used in the layers 3 and 4) to obtain a film having a good bonding to polystyrene.

EXAMPLE II

Two structures, each built up from a film of high-impact polystyrene with a rubber content of 8–10% by weight and a gel fraction of 20–25% by weight and a layer of polybutylene terephthalate (PBT having an intrinsic viscosity of 1.10 parts/g) were manufactured by coextrusion in a Reifenhäuser extruder. In the first case the layer consisted of pure PBT; in the second case it consisted of a mixture of 90% by weight of PBT and 10% by weight of DYLARK ® 250 (as used in Example I).

In the coestrusion in a Reifenhäuser extruder, the PBT/DYLARK ® mixture was prepared directly in the coextruder of the machine. The high-impact polystyrene was added in the main extruder.

A procedure similar to that described in Example I was followed for determining the bonding strength between the layers: the layers were separated from each other mechanically over a certain length. The end of one of the two layers was bent back over an angle of approximately 180° C. The ends of the detached layers were clamped in a drawing machine. The force was determined which occurred when the two layers detached (fracture). The found values are recorded in Table C.

TABLE C

| Structure | Force when the layers detached (N) |
|---|---|
| ○ High-impact polystyrene/PBT* | 0.3 |
| ○ High-impact polystyrene/PBT + DYLARK ® 250 | >35 |

*Comparative example

It also appears from Table C that in structures having layers consisting of (high-impact) polystyrene and PBT a certain bonding already occurs between the layers. This bonding can be considerably improved by using a polymer mixture according to the invention.

We claim:

1. A laminate comprising a film (a) prepared from a polymer mixture comprising a polybutylene terephthalate ester having a butylene terephthalate content of at least 80 mol % and a rubber modified styrenemaleic anhydride copolymer having a rubber content of 3 to 20% by weight, with 3 to 20 mol % of maleic anhydride and 80 to 97 mol % styrene and with a number average molecular weight as determined by gel permeation chromatography (against a polystyrene standard) of 50,000 to 400,000 and a polystyrene film (b).

2. A laminate according to claim 1 wherein the polymer mixture comprises 1 to 50% by weight of the styrene-maleic anhydride copolymer and 99 to 50% by weight of the polybutylene terephthalate.

3. A laminate of claim 1 wherein the polymer mixture of film (a) consists essentially of the butylene terephthalate and the rubber modified styrene-maleic anhydride copolymer as set forth in claim 1.

4. The laminate of claim 1 wherein the film (a) contains reinforcing fibers.

5. The laminate of claim 1 wherein the film (a) contains a flameretardant.

6. The laminate of claim 1 wherein film (a) and film (b) are co-extruded to form the laminate.

* * * * *